United States Patent
Wagner et al.

(10) Patent No.: US 9,718,379 B2
(45) Date of Patent: Aug. 1, 2017

(54) BRACKET FOR A BODYSHELL STRUCTURE OF A MOTOR VEHICLE

(71) Applicant: Dr. Ing. h.c. F. Porsche Aktiengesellschaft, Stuttgart (DE)

(72) Inventors: Michael Wagner, Wiernsheim-Pinache (DE); Thomas Dittus, Heimsheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/854,074

(22) Filed: Sep. 15, 2015

(65) Prior Publication Data

US 2016/0075289 A1    Mar. 17, 2016

(30) Foreign Application Priority Data

Sep. 15, 2014  (DE) .......................... 10 2014 113 239

(51) Int. Cl.
*B60N 2/02* (2006.01)
*B60N 2/28* (2006.01)

(52) U.S. Cl.
CPC .................................. *B60N 2/289* (2013.01)

(58) Field of Classification Search
CPC ....................................................... B60N 2/289
See application file for complete search history.

(56) References Cited

U.S. PATENT DOCUMENTS

| 6,361,115 B1 | 3/2002 | Aufrere et al. |
| 6,845,055 B1 | 1/2005 | Koga et al. |
| 2006/0049622 A1 | 3/2006 | Yamamoto |
| 2008/0246297 A1 | 10/2008 | Tietje |

FOREIGN PATENT DOCUMENTS

| DE | 100 04 598 | 8/2000 |
| DE | 100 50 422 | 4/2002 |
| DE | 10 2006 007 314 | 8/2007 |
| EP | 0 927 659 | 7/1999 |
| FR | 2 822 766 | 10/2002 |
| FR | 2 883 524 | 9/2006 |
| JP | 2002-219976 | 8/2002 |
| JP | 2007-168616 | 7/2007 |
| KR | 10-2004-0026478 | 3/2004 |

OTHER PUBLICATIONS

German Search Report of May 6, 2015.

*Primary Examiner* — Lori L Lyjak
(74) *Attorney, Agent, or Firm* — Gerald E. Hespos; Michael J. Porco; Matthew T. Hespos

(57) ABSTRACT

A bracket (2) is provided for fastening to a bodyshell structure (6) of a motor vehicle. The bracket (2) is a bar that is bent to define first and second end sections (10, 28), first and second arcuate sections (11, 19) and a central section (18). The first end section (10) merges into the first arcuate section (11), the first arcuate section (11) merges into the central section (18), the central section (18) merges into the second arcuate section (19), and the second arcuate section (19) merges into a second end section (28). The end sections (10, 28) are parallel, and the central section (18) is perpendicular to the end sections (10, 28). Each arcuate section (11, 19) has plural partially arcuate sections (12, 14, 16, 20, 22, 24, 26), including one that is parallel to the central section (18).

30 Claims, 5 Drawing Sheets

BRACKET FOR A BODYSHELL STRUCTURE OF A MOTOR VEHICLE

CROSS REFERENCE TO RELATED APPLICATION

This application claims priority under 35 USC 119 to German Patent Appl. No. 10 2014 113 239.4 filed on Sep. 15, 2014, the entire disclosure of which is incorporated herein by reference.

BACKGROUND

1. Field of the Invention

The invention relates to a bracket for a bodyshell structure of a motor vehicle and to a structural arrangement for a motor vehicle.

2. Description of the Related Art

An additional device can be arranged temporarily in an interior of a motor vehicle, but the device must be secured in the interior at a designated location so that the device cannot move within the interior when driving or braking the motor vehicle. A device of this type can be a child seat that can be arranged on a seat of the motor vehicle and can be fastened thereto directly or indirectly via a fastening arrangement.

DE 100 50 422 A1 describes a motor vehicle with a restraint system for a separate child seat that can be connected rigidly to the motor vehicle. The restraint system can be pivoted from a visually concealed non-use position into a use position in which a fastening means of the restraint system is lockable to a latching device of the child seat.

DE 10 2006 007 374 A1 describes an apparatus for fastening a backrest of a motor vehicle seat. The apparatus has a cross member arranged on a rear structure of the motor vehicle and reaching over at least part of a width of the motor vehicle. At least one receptacle is provided for fastening the backrest at the lower end section thereof.

US 2006/0049622 A1 describes a motor vehicle with a seat that has an anchor for fastening a child seat. The child seat also can be fastened to a further point in an interior of the motor vehicle via a belt.

U.S. Pat. No. 6,485,055 B1 discloses an anchor in an interior of a motor vehicle and to which a child seat can be fastened. This anchor has a U-shaped bracket with bent limbs.

KR 1020040026478 A describes a fastening arrangement for fastening an anchor for a seat in an interior of a motor vehicle.

Against this background, it is an object of the invention to provide a structure via which an additional device can be fastened temporarily, but securely, in the interior of a motor vehicle.

SUMMARY

The invention relates to a bracket that can be fastened to a bodyshell structure of a motor vehicle. The bracket comprises a bar that is bent at a plurality of bending points. The bar has first and second end sections, first and second arcuate sections and a central section. The first end section merges into the first arcuate section, the first arcuate section merges into the central section, the central section merges into the second arcuate section and the second arcuate section merges into the second end section. The end sections are parallel to each other and the central section is perpendicular to the two end sections. Each arcuate section has a plurality of partially arcuate sections, and a partially arcuate section of at least one of the two arcuate sections is parallel to the central section.

At least one such bracket can be fastened to the bodyshell structure, as a supporting part of the motor vehicle, and an additional device can be fastened temporarily to the at least one bracket. Therefore, the additional device can be fastened to the bodyshell structure via the at least one bracket. A device of this type is designed, for example, as a child seat. The bracket can be referred to as an isofix bracket.

The end sections are arranged in an end section plane, and the central section is arranged in a central section plane that is parallel to the end section plane. The arcuate sections are between the end section plane and the central section plane.

Each end section, the central section and each partially arcuate section of each arcuate section of the bracket or bent bar is referred to as an individual section. Each individual section is of rectilinear and bar-shaped design. Two directly adjacent individual sections along the bar are connected to each other via a bending point.

All of the partially arcuate sections of the first arcuate section are arranged in a first arcuate section plane that is perpendicular to the end section plane and to the central section plane. As explained below, at least one such bracket can be fastened to the bodyshell structure, as a supporting part of the motor vehicle, and an additional device can be fastened temporarily to the at least one bracket. Therefore the additional device can be fastened to the bodyshell structure via the at least one bracket. A device of this type may be a child seat. The first end section also is arranged in the first arcuate section plane.

The first arcuate section has a first, second and third partially arcuate sections. The first end section merges into the first partially arcuate section of the first arcuate section, the first partially arcuate section of the first arcuate section merges into a second partially arcuate section of the first arcuate section, the second partially arcuate section of the first arcuate section merges into a third partially arcuate section of the first arcuate section and the third partially arcuate section of the first arcuate section merges into the central section.

The first partially arcuate section of the first arcuate section may be oriented at an obtuse angle to the first end section. The first and second partially arcuate sections of the first arcuate section may be oriented at an acute angle to each other. The second and third partially arcuate sections of the first arcuate section may be oriented at an obtuse angle to each other. The third partially arcuate section of the first arcuate section and the central section may be oriented at a right angle to each other.

The second arcuate section of the bracket comprises first, second, third and fourth partially arcuate sections. The central section merges into the first partially arcuate section of the second arcuate section, the first partially arcuate section of the second arcuate section merges into the second partially arcuate section of the second arcuate section, the second partially arcuate section of the second arcuate section merges into the third partially arcuate section of the second arcuate section, the third partially arcuate section of the second arcuate section merges into the fourth partially arcuate section of the second arcuate section and the fourth partially arcuate section merges into the second arcuate section.

The central section and the first partially arcuate section of the second arcuate section may be oriented at a right angle to each other. The first and second partially arcuate sections of the second arcuate section may be oriented at an obtuse angle to each other. The second and third partially arcuate sections of the second arcuate section may be oriented at a right angle to each other. The third and fourth partially arcuate sections of the second arcuate section also may be oriented at a right angle to each other. The fourth partially arcuate section of the second arcuate section and the second end section may be oriented at an obtuse angle to each other. Furthermore, the central section and the third partially arcuate section of the second arcuate section are arranged parallel to each other.

The first partially arcuate section of the first arcuate section and the fourth partially arcuate section of the second arcuate section may be oriented parallel to each other. The second partially arcuate section of the first arcuate section and the second partially arcuate section of the second arcuate section also may be oriented parallel to each other. Furthermore, the third partially arcuate section of the first arcuate section and the first partially arcuate section of the second arcuate section are connected to the central section and may be parallel to each other and in the same plane as the central section. This plane may be perpendicular to the above-defined central section plane.

The first partially arcuate section of the first arcuate section and the fourth partially arcuate section of the second arcuate section may define fastening sections.

The structure arrangement of the invention is provided for a motor vehicle and comprises at least one bracket and a bodyshell structure. The at least one bracket can be configured as described above.

The at least one bracket can be fastened to the bodyshell structure. At least one further device, for example a child seat, can be fastened via the at least one bracket to the bodyshell structure and can be secured thereon. The central section of the at least one bracket may define a holding element for the at least one further device. In this regard, for example, a fastening element of the at least one device may be connected temporarily to the central section of the at least one bracket.

The at least one bracket can be connected to the bodyshell structure, for example, via the two end sections. The structural arrangement comprises a carrying body that can be connected to the bodyshell structure. The two end sections of the at least one bracket can be fastened to the carrying body which, in turn, can be fastened to the bodyshell structure. An indirect connection can therefore be provided between the bodyshell structure and the at least one bracket via the carrying body.

The end sections of the at least one bracket can be arranged in at least one receiving pocket of the carrying body and may be welded to the carrying body. The carrying body customarily is designed as a cross member.

The structural arrangement may further comprise at least one base plate to which the end sections of the at least one bracket can be fastened by, for example, welding. In addition, the two end sections of the at least one bracket can be arranged between the carrying body and the at least one base plate. Thus, the at least one base plate can be arranged on fastened to the carrying body.

The at least one bracket may comprise a bent bar that is divided into the two end sections, the two arcuate sections and the central section and is bent at least along the arcuate sections.

Part of the arcuate section of the at least one bracket of the structural arrangement may comprise at least one fastening section via which the at least one bracket can be connected to the bodyshell structure. The at least one fastening section can be welded directly to the bodyshell structure and may be a partially arcuate section of a respective arcuate section.

The structural arrangement may comprise the at least one bracket, the bodyshell structure and the carrying body. The at least one bracket can be fastened via the two end sections thereof to the carrying body and therefore indirectly to the bodyshell structure. The carrying body also can be fastened to the bodyshell structure, and the at least one bracket also can be fastened directly via the fastening sections thereof to the bodyshell structure.

Further advantages and refinements of the invention emerge from the description and the attached drawings. The features mentioned above and those explained below are usable in the stated combination, in other combinations or on their own without departing from the scope of the invention.

The invention is illustrated schematically in the drawings using embodiments and is described schematically and in detail with reference to the drawings.

DETAILED DESCRIPTION

Figure 1:
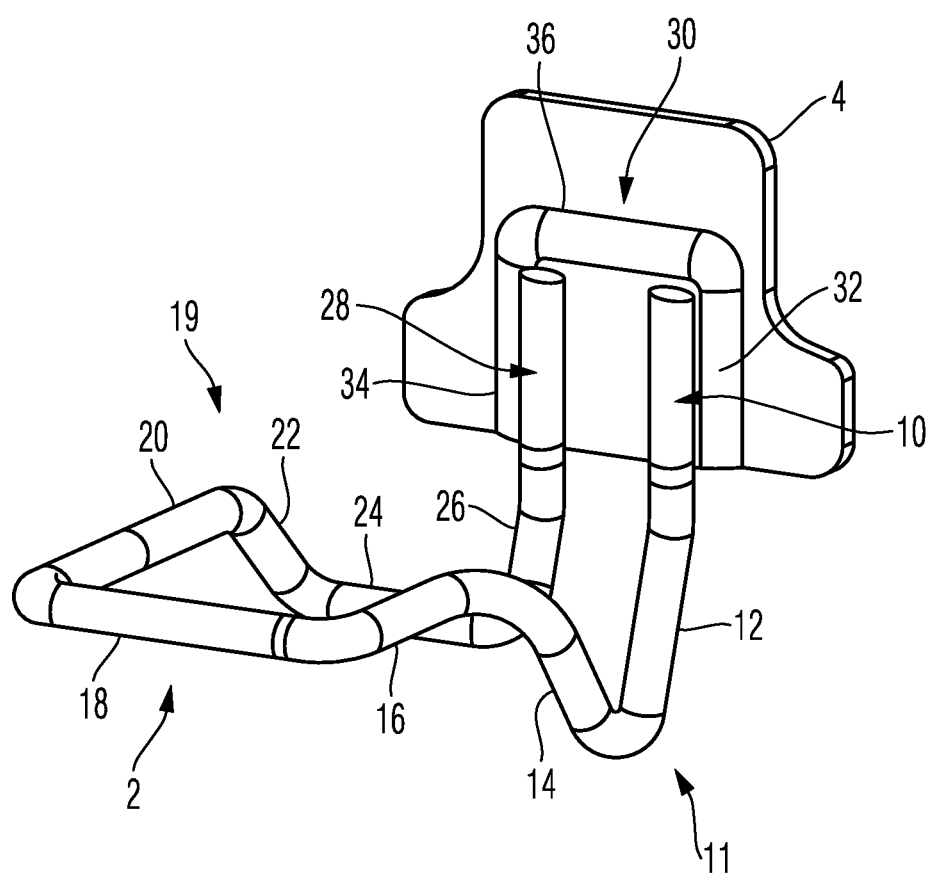
FIG. 1 is a schematic illustration of a bracket according to an embodiment of the invention and an example of a base plate as components of a structural arrangement according to the invention.

A bracket 2 and a base plate 4 according to a first embodiment of the invention are illustrated schematically in FIG. 1 and define parts of a structural device as illustrated in FIGS. 2-5. More particularly, FIGS. 2-5 show embodiments of the bracket 2a, 2b, 2c and 2d fastened to a cross member 8.

The bracket 2, 2a, 2b, 2c, 2d according to the invention comprises a bar formed from metallic material of circular cross section and bent at a plurality of bending points. The bar and therefore the bracket 2, 2a, 2b, 2c, 2d has a plurality of individual sections and bending points provided by bending each bar between individual sections during production of the bracket 2, 2a, 2b, 2c, 2d. The individual sections of the bracket 2, 2a, 2b, 2c, 2d are assigned reference numbers only in FIGS. 1 and 5. For the sake of better clarity, the reference numbers are omitted in the FIGS. 2, 3, 4.

The individual sections of the bracket 2, 2a, 2b, 2c, 2d are enumerated from right to left and/or in the clockwise direction on the basis of FIG. 1. The individual sections are a first end section 10 that merges after a bending point into a first partially arcuate section 12 of a first arcuate section 11. The first partially arcuate section 12 merges at a bending point into a second partially arcuate section 14 of the first arcuate section 11. In addition, the second partially arcuate section 14 merges into a third partially arcuate section 16 of the first arcuate section 11 and the third partially arcuate section 16 of the first arcuate section 11 merges into a central section 18.

A second arcuate section 19 of the bracket 2 comprises a first partially arcuate section 20, and the central section 18 merges at a further bending point into the first partially arcuate section 20 of the second arcuate section 19. The first partially arcuate section 20 of the second arcuate section 19 merges at a bending point into a second partially arcuate section 22 of the first arcuate section 19. The second partially arcuate section 22 likewise merges at a bending point into a third partially arcuate section 24 of the second arcuate section 19. The third partially arcuate section 24 merges in turn at a bending point into a fourth partially arcuate section 26 of the second arcuate section 19. In addition, the fourth partially arcuate section 26 of the second arcuate section 19 merges into a second end section 28.

Figure 5:
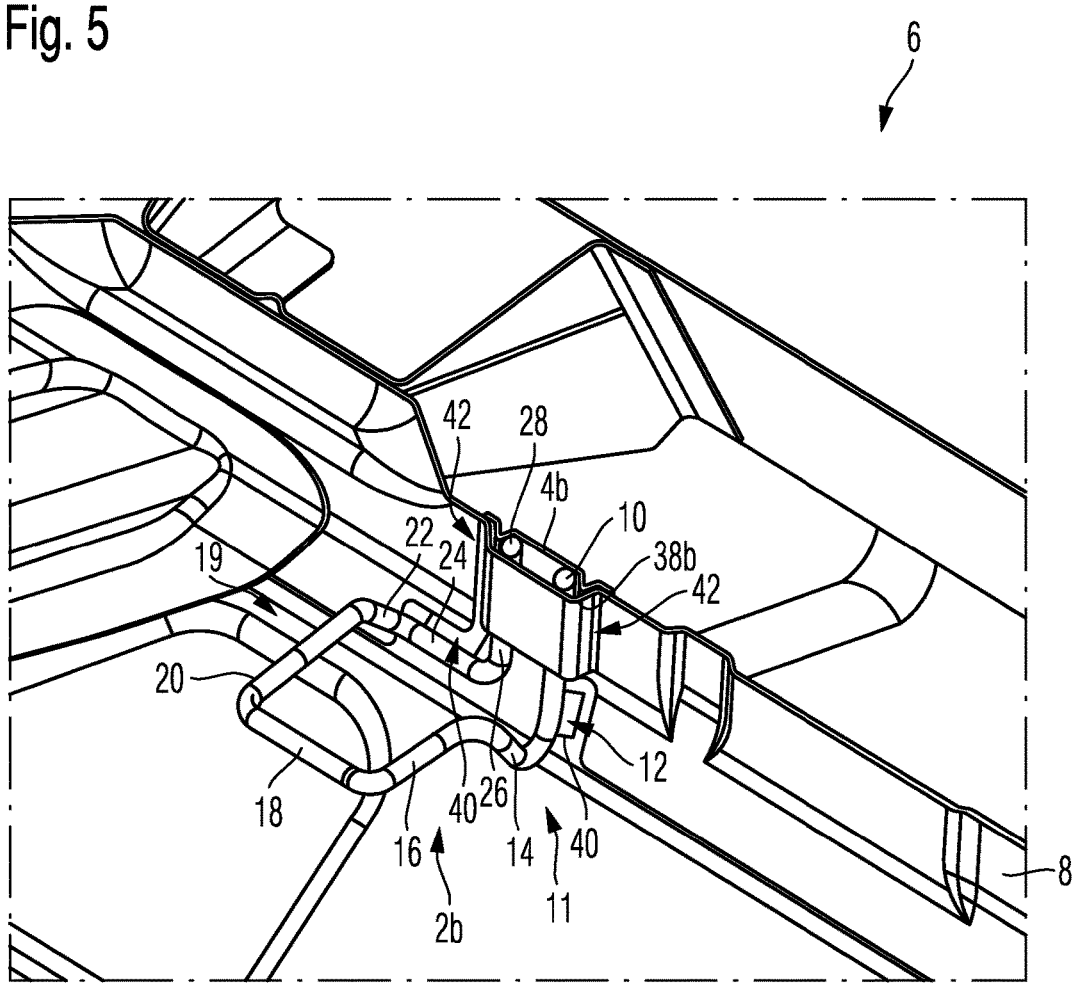
FIG. 5 shows a detail from FIG. 4.

The two end sections 10, 28 are arranged parallel to each other, as shown in FIGS. 1 and 5. In addition, all of the partially arcuate sections 12, 14, 16 of the first arcuate section 11 and the first end section 10 are arranged in a common plane. The first end section 10 and the first partially arcuate section 12 of the first arcuate section 11 are oriented at an obtuse angle to each other within this common plane. The first and second partially arcuate sections 12, 14 of the first arcuate section 11 are oriented at an acute angle to each other. The second partially arcuate section 14 and the third partially arcuate section 16 are in turn oriented at an obtuse angle to each other. The third partially arcuate section 16 of the first arcuate section and the central section 18 are oriented at an angle of 90° to each other.

The central section 18 is perpendicular to the two end sections 10, 28. Furthermore, the third partially arcuate section 16 of the first arcuate section 11 also is perpendicular to each of the two individual sections 10, 28. Furthermore, the first partially arcuate section 20 of the second arcuate section 19 also is perpendicular to the central section 18. The first and second partially arcuate sections 20 and 22 of the first arcuate section 19 are oriented at an obtuse angle to each other. In contrast, the second partially arcuate section 22 is oriented at a right angle to the third partially arcuate section 24 of the second arcuate section 19. Said third partially arcuate section 24 also is oriented at an angle of 90° to the fourth partially arcuate section 26 of the arcuate section 19.

In a refinement, the first and second partially arcuate sections 20 and 22 of the second arcuate section 19 are arranged in a plane, with respect to which both the central section 18 and the third partially arcuate section 24 of the second arcuate section 19 are oriented perpendicularly. By contrast, the fourth partially arcuate section 26 of the second arcuate section 19 is parallel to the plane with the first and the second partially arcuate sections 20, 22 of the second arcuate section 19. In addition, the plane with the first and second partially arcuate sections 20, 22 is parallel to the plane in which the partially arcuate sections 12, 14, 16 of the first arcuate section 11 are arranged. The central section 18 and the third and the fourth partially arcuate sections 24, 26 are arranged between the two last-mentioned planes.

As shown in FIGS. 1 and 5, the first partially arcuate section 12 of the first arcuate section 11 and the fourth partially arcuate section 26 of the second arcuate section 19 merge respectively into end sections 10, 28 and are parallel to each other. In addition, the third partially arcuate section 16 of the first arcuate section 11 and the first partially arcuate section 20 of the second arcuate section 19 merge perpendicularly into the central section 18 and are parallel to each other. The third partially arcuate section 24 of the second arcuate section 19 is parallel to the central section 18. Furthermore, the second partially arcuate section 14 of the first arcuate section 11 and the second partially arcuate section 22 of the second arcuate section 19 are parallel to each other.

The carrying plate 4 comprises a U-shaped receiving element 30 with first and second parallel outer limbs 32 and 34 that are connected to each other via a connecting limb 36. The first end section 10 is on the first outer limb 32 and the second end section 28 is on the second outer limb 34. Ends of the two end sections 10, 28 are arranged on the connecting limb 36. The two end sections 10, 28 of the bracket 2 are fastened to the base plate 4 via a thermal joining method, here via a welding method, such as shielded arc welding.

Figure 2:
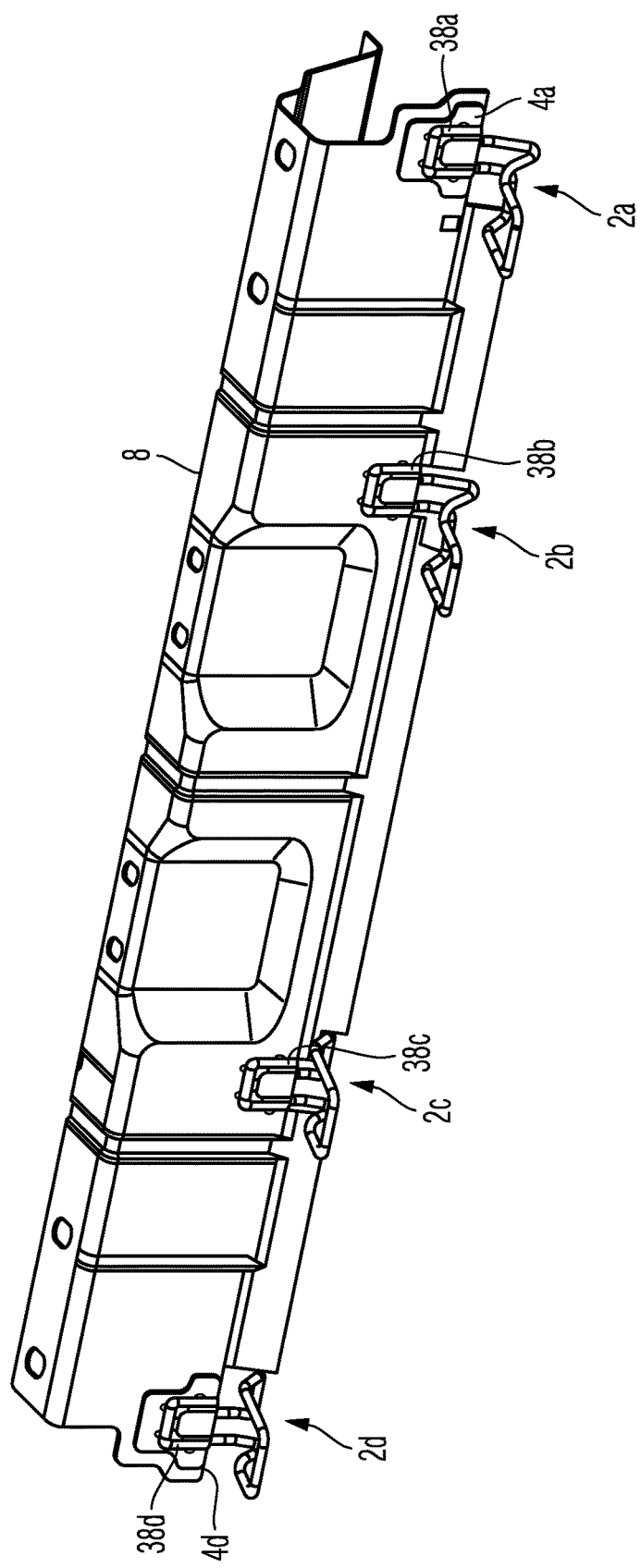
FIG. 2 is a schematic illustration of a carrying body as a further component of the structural arrangement of the invention and examples of the bracket of FIG. 1.
Figure 3:
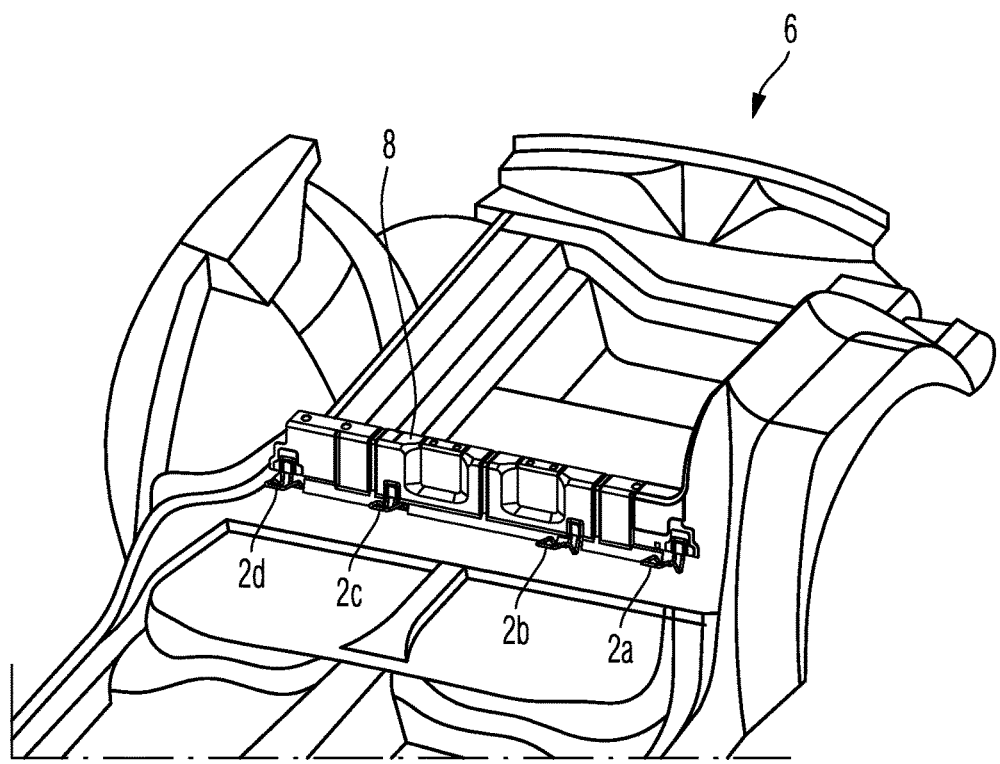
FIG. 3 is a schematic illustration of the first embodiment of the structural arrangement.

The examples of the bracket 2a, 2b, 2c, 2d shown in FIG. 2 are fastened to the cross member 8 via spot welding. FIG. 2 also shows first and fourth brackets 2a and 2d connected respectively to carrying plates 4a and 4d assigned thereto. FIG. 2 also shows that the cross member 8 and therefore of the carrying body has receiving pockets 38a, 38b, 38c, 38d. The two end sections 10, 28 of a respective bracket 2a, 2b, 2c, 2d are in each case are accommodated within the receiving pockets 38a, 38b, 38c, 38d.

As shown in FIG. 2, the two first brackets 2a, 2b have individual sections arranged in precisely the same manner as the bracket 2 of FIG. 1. However, the individual sections of a third bracket 2c and the fourth bracket 2d are formed in a mirror-inverted manner with respect to the first and second brackets 2a and 2b of FIG. 2 and with respect to the bracket 2 illustrated in FIG. 1.

Figure 4:
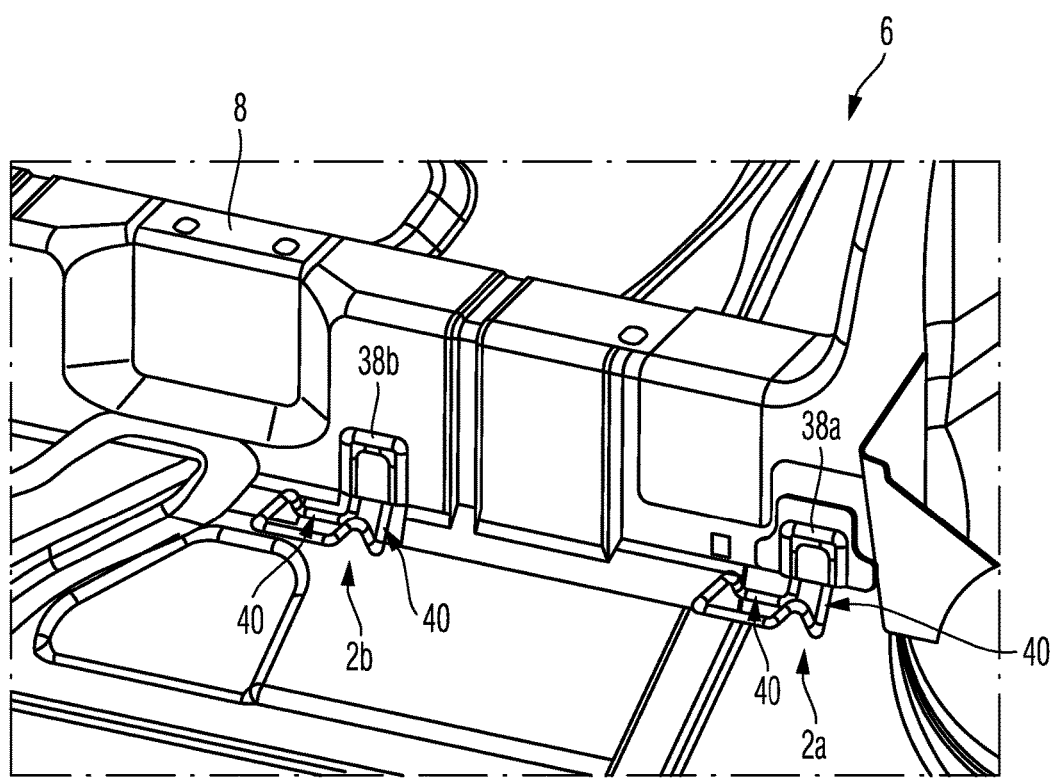
FIG. 4 shows a detail from FIG. 3.

The first partially arcuate section 12 of the first arcuate section 11 and the fourth partially arcuate section 26 of the second arcuate section 19 of the respective brackets 2, 2a, 2b, 2c, 2d also define fastening sections. FIGS. 4 and 5 show that the first partially arcuate section 12 of the first arcuate section 11 and the third partially arcuate section 24 of the second arcuate section 19 of each respective bracket 2, 2a, 2b, 2c, 2d are fastened to the bodyshell structure 6 via thermal joining connections 40 designed as welded joints.

The overall result therefore is that each bracket 2, 2a, 2b, 2c, 2d is connected via a partially arcuate section 12, 26, which are designed as a fastening sections, to the bodyshell structure 6 by welding and therefore is fastened directly to the bodyshell structure 6. The end sections 10, 28 of the respective brackets 2, 2a, 2b, 2c, 2d are connected to the cross member 8 via welded joints. The cross member 8 is connected or fastened to the bodyshell structure 6. It is therefore possible to connect a respective bracket 2, 2a, 2b, 2c, 2d directly to the bodyshell structure 6 via respective fastening sections and indirectly to the bodyshell structure 6 by the two end sections 10, 28 via the cross member 8 and/or to fasten the respective bracket to said bodyshell structure 6. Furthermore, thermal joining connections 42 in the form of spot weldings are illustrated in FIG. 5. The carrying plate 4b shown in FIG. 5 is connected to the cross member 8 via joining connections 42 of this type. In addition to the two end sections 10, 28 of the bracket 2b, the limbs 32, 34 of the carrying plate 4b also are arranged and/or accommodated within the receiving pocket 38b.

The central section 18 of each respective bracket 2, 2a, 2b, 2c, 2d fastened directly and indirectly to the bodyshell structure 6 serves as a holding section to which a device, for example a child seat, can be fastened temporarily and re-detachably.

What is claimed is:

1. A bracket configured for fastening to a bodyshell structure of a motor vehicle, the bracket having a bar that is bent at a plurality of bending points to define first and second end sections, first and second arcuate sections and a central section, the first end section merging into the first arcuate section, the first arcuate section merging into the central section, the central section merging into the second arcuate section, and the second arcuate section merging into the second end section, the first and second end sections being substantially parallel to each other, the central section being substantially perpendicular to the two end sections, each of the arcuate section having a plurality of partially arcuate sections, all of the partially arcuate sections of the first arcuate section are arranged in a common plane that is perpendicular to the central section and a partially arcuate section of at least one of the two arcuate sections being arranged parallel to the central section.

2. The bracket of claim 1, wherein each of the end sections, the central section and each of the partially arcuate sections of each arcuate section defines an individual section, each of the individual sections being rectilinear, and directly adjacent individual sections along the bar being connected to each other via bending points.

3. The bracket of claim 1, wherein the first end section is in the common plane.

4. The bracket of claim 1, wherein the first arcuate section has first, second and third partially arcuate sections, the first end section merging into the first partially arcuate section of the first arcuate section, the first partially arcuate section of the first arcuate section merging into the second partially arcuate section of the first arcuate section, the second partially arcuate section of the first arcuate section merging into the third partially arcuate section of the first arcuate section, and the third partially arcuate section of the first arcuate section merges into the central section.

5. The bracket of claim 4, wherein the first partially arcuate section of the first arcuate section is oriented at an obtuse angle to the first end section.

6. The bracket of claim 5, wherein the first and second partially arcuate sections of the first arcuate section are oriented at an acute angle to each other.

7. The bracket of claim 6, wherein the second and third partially arcuate sections of the first arcuate section are oriented at an obtuse angle to each other.

8. The bracket of claim 7, wherein the third partially arcuate section of the first arcuate section and the central section are oriented at a right angle to each other.

9. The bracket of claim 4, wherein the second arcuate section has a first, second, third and fourth partially arcuate sections, the central section merging into the first partially arcuate section of the second arcuate section, the first partially arcuate section of the second arcuate section merging into the second partially arcuate section of the second arcuate section, the second partially arcuate section of the second arcuate section merging into the third partially arcuate section of the second arcuate section, the third partially arcuate section of the second arcuate section merging into a fourth partially arcuate section of the second arcuate section, and the fourth partially arcuate section merging into the second end section.

10. The bracket of claim 9, wherein the central section and the first partially arcuate section of the second arcuate section are oriented at a right angle to each other.

11. The bracket of claim 10, wherein the first and second partially arcuate sections of the second arcuate section are oriented at an obtuse angle to each other.

12. The bracket of claim 11, wherein the second and third partially arcuate sections of the second arcuate section are oriented at a right angle to each other.

13. The bracket of claim 12, wherein the third and fourth partially arcuate sections of the second arcuate section are oriented at a right angle to each other.

14. The bracket of claim 13, wherein the fourth partially arcuate section of the second arcuate section and the second end section are oriented at an obtuse angle to each other.

15. The bracket of claim 14, wherein the central section and the third partially arcuate section of the second arcuate section are parallel to each other.

16. The bracket of claim 9, wherein the first partially arcuate section of the first arcuate section and the fourth partially arcuate section of the second arcuate section are parallel to each other.

17. The bracket as of claim 9, wherein the second partially arcuate section of the first arcuate section and the second partially arcuate section of the second arcuate section are parallel to each other.

18. The bracket of claim 17, wherein the first partially arcuate section of the first arcuate section is a fastening section.

19. A bracket configured for fastening to a bodyshell structure of a motor vehicle, the bracket having a bar that is bent at a plurality of bending points to define a first end section, the first end section merging into a first arcuate section, the first arcuate section merging into a central section, the central section merging into a second arcuate section, and the second arcuate section merging into a second end section that is substantially parallel to the first end section, the central section being substantially perpendicular to the first and second end sections, the first arcuate section having a first partially arcuate section that merges into the first end section, the first partially arcuate section of the first arcuate section further merging into a second partially arcuate section of the first arcuate section, the second partially arcuate section of the first arcuate section merging into a third partially arcuate section of the first arcuate section, and the third partially arcuate section of the first arcuate section merging into the central section, the central section merging into a first partially arcuate section of the second arcuate section, the first partially arcuate section of the second arcuate section merging into a second partially arcuate section of the second arcuate section, the second partially arcuate section of the second arcuate section merging into a third partially arcuate section of the second arcuate section, the third partially arcuate section of the second arcuate section being substantially parallel to the central section and merging into a fourth partially arcuate section of the second arcuate section, and the fourth partially arcuate section merging into the second end section wherein the first partially arcuate section of the first arcuate section and the fourth partially arcuate section of the second arcuate section is a are fastening sections configured for fastening to the bodyshell structure of the motor vehicle.

20. A structural arrangement for a motor vehicle, comprising: a bodyshell structure, a receiving pocket formed on or attached to the bodyshell structure, and at least one bracket being a bar that is bent at a plurality of bending points to define first and second end sections that are parallel to one another and fastened to the receiving pocket formed on or attached to the bodyshell structure, the at least one bracket further having first and second arcuate sections extending respectively from the first and second end sections and a central section connecting ends of the first and second arcuate sections remote from the end sections, the central section being perpendicular to the end sections, the first arcuate section having plural partially arcuate sections including a partially arcuate section that merges into the first end section and is fastened to the bodyshell structure, and the second arcuate sections including a partially arcuate section that is parallel to the central section and is fastened to the bodyshell structure.

21. The structural arrangement of claim 20, further comprising a carrying body connected to the bodyshell structure.

22. The structural arrangement of claim 21, wherein the end sections of the at least one bracket are fastened to the carrying body.

23. The structural arrangement of claim 22, wherein the receiving pocket is formed on the carrying body.

24. The structural arrangement of claim 23, wherein the end sections of the at least one bracket are welded to the carrying body.

25. The structural arrangement of claim 22, in which the carrying body is a cross member.

26. The structural arrangement of claim 20, wherein the structural arrangement has a base plate to which the end sections of the at least one bracket are fastened.

27. The structural arrangement of claim 26, wherein the end sections of the at least one bracket are welded to the base plate.

28. The structural arrangement of claim 27, wherein the end sections of the bracket are arranged between the carrying body and the base plate, and the base plate is arranged on the carrying body.

29. The structural arrangement of claim 20, wherein the at least one bracket has at least one fastening section via which the at least one bracket is welded to the bodyshell structure.

30. The structural arrangement of claim 20, wherein all of the partially arcuate sections of the first arcuate section are arranged in a common plane that is perpendicular to the central section.

\* \* \* \* \*